United States Patent [19]

Oakley

[11] 4,027,884
[45] June 7, 1977

[54] BETTING DEVICE

[76] Inventor: Thomas J. Oakley, 5811 Jarvis Lane, Bethesda, Md. 20014

[22] Filed: Mar. 19, 1976

[21] Appl. No.: 668,668

[52] U.S. Cl. .......................................... 273/148 R
[51] Int. Cl.² .......................................... G09F 9/00
[58] Field of Search ............... 273/148 R, 155, 161, 273/152.1; 40/63 R, 67, 64 R; 116/120; 235/89 R

[56] References Cited

UNITED STATES PATENTS

| | | | |
|---|---|---|---|
| 1,165,465 | 12/1915 | Taylor | 273/152.1 UX |
| 1,560,963 | 11/1925 | Art | 273/155 UX |
| 2,234,341 | 3/1941 | Goldner | 273/161 |
| 2,460,563 | 2/1949 | Zelvin | 273/155 |
| 3,332,156 | 7/1967 | Reeves | 273/161 X |
| 3,355,821 | 12/1967 | Buenger | 273/155 X |

*Primary Examiner*—Anton O. Oechsle
*Attorney, Agent, or Firm*—Stevens, Davis, Miller & Mosher

[57] ABSTRACT

A betting device is disclosed for indicating all of the combinations of numbers, for example 1 through 12, in groups of only two or three different numbers each, from at least three or four different preselected ones of the numbers. The device comprises a base card having combinations of the numbers 1 through 12 in groups of only two or three different ones of the numbers each thereon. The device further includes a first partially adiaphanous and partially transparent overlay sheet which covers all of the groups of numbers on the base card which include the number 1 and exposes all of the groups of numbers on the base card which include only numbers other than 1 when the first sheet overlays the base card. Likewise, the device includes second, third, fourth, etc. overlay sheets which cover all of the groups of numbers on the base card which include the corresponding number of that sheet and exposes all of the groups of numbers on the base card which include only numbers other than the corresponding number of that sheet when that sheet overlays the base card. As a result, when the overlay sheets corresponding to at least three or four different preselected ones of said numbers are removed from their position overlying the base card all of the combinations of the preselected numbers, in groups of only two or three different ones of the numbers each on the base card, are exposed.

12 Claims, 17 Drawing Figures

TRIPLE
4-6-12
3-6-12
3-4-6
3-4-12

EXACTA
6-12
4-12
3-12
3-4
3-6
4-6

TRIPLE
1-6-11
1-4-5
1-4-6
5-6-11
1-4-11
4-5-6
1-5-6
4-5-11
1-5-11
4-6-11

EXACTA
1-11
1-4
1-5
1-6
6-11
5-11
4-11
5-6
4-5
4-6

FIG. 5

TRIPLE

| | | | | | |
|---|---|---|---|---|---|
| 1-2-3 | 1-6-10 | 2-5-8 | 3-5-9 | 4-6-12 | 6-7-8 |
| 1-2-4 | 1-6-11 | 2-5-9 | 3-5-10 | 4-7-8 | 6-7-9 |
| 1-2-5 | 1-6-12 | 2-5-10 | 3-5-11 | 4-7-9 | 6-7-10 |
| 1-2-6 | 1-7-8 | 2-5-11 | 3-5-12 | 4-7-10 | 6-7-11 |
| 1-2-7 | 1-7-9 | 2-5-12 | 3-6-7 | 4-7-11 | 6-7-12 |
| 1-2-8 | 1-7-10 | 2-6-7 | 3-6-8 | 4-7-12 | 6-8-9 |
| 1-2-9 | 1-7-11 | 2-6-8 | 3-6-9 | 4-8-9 | 6-8-10 |
| 1-2-10 | 1-7-12 | 2-6-9 | 3-6-10 | 4-8-10 | 6-8-11 |
| 1-2-11 | 1-8-9 | 2-6-10 | 3-6-11 | 4-8-11 | 6-8-12 |
| 1-2-12 | 1-8-10 | 2-6-11 | 3-6-12 | 4-8-12 | 6-9-10 |
| 1-3-4 | 1-8-11 | 2-6-12 | 3-7-8 | 4-9-10 | 6-9-11 |
| 1-3-5 | 1-8-12 | 2-7-8 | 3-7-9 | 4-9-11 | 6-9-12 |
| 1-3-6 | 1-9-10 | 2-7-9 | 3-7-10 | 4-9-12 | 6-10-11 |
| 1-3-7 | 1-9-11 | 2-7-10 | 3-7-11 | 4-10-11 | 6-10-12 |
| 1-3-8 | 1-9-12 | 2-7-11 | 3-7-12 | 4-10-12 | 6-11-12 |
| 1-3-9 | 1-10-11 | 2-7-12 | 3-8-9 | 4-11-12 | 7-8-9 |
| 1-3-10 | 1-10-12 | 2-8-9 | 3-8-10 | 5-6-7 | 7-8-10 |
| 1-3-11 | 1-11-12 | 2-8-10 | 3-8-11 | 5-6-8 | 7-8-11 |
| 1-3-12 | 2-3-4 | 2-8-11 | 3-8-12 | 5-6-9 | 7-8-12 |
| 1-4-5 | 2-3-5 | 2-8-12 | 3-9-10 | 5-6-10 | 7-9-10 |
| 1-4-6 | 2-3-6 | 2-9-10 | 3-9-11 | 5-6-11 | 7-9-11 |
| 1-4-7 | 2-3-7 | 2-9-11 | 3-9-12 | 5-6-12 | 7-9-12 |
| 1-4-8 | 2-3-8 | 2-9-12 | 3-10-11 | 5-7-8 | 7-10-11 |
| 1-4-9 | 2-3-9 | 2-10-11 | 3-10-12 | 5-7-9 | 7-10-12 |
| 1-4-10 | 2-3-10 | 2-10-12 | 3-11-12 | 5-7-10 | 7-11-12 |
| 1-4-11 | 2-3-11 | 2-11-12 | 4-5-6 | 5-7-11 | 8-9-10 |
| 1-4-12 | 2-3-12 | 3-4-5 | 4-5-7 | 5-7-12 | 8-9-11 |
| 1-5-6 | 2-4-5 | 3-4-6 | 4-5-8 | 5-8-9 | 8-9-12 |
| 1-5-7 | 2-4-6 | 3-4-7 | 4-5-9 | 5-8-10 | 8-10-11 |
| 1-5-8 | 2-4-7 | 3-4-8 | 4-5-10 | 5-8-11 | 8-10-12 |
| 1-5-9 | 2-4-8 | 3-4-9 | 4-5-11 | 5-8-12 | 8-11-12 |
| 1-5-10 | 2-4-9 | 3-4-10 | 4-5-12 | 5-9-10 | 9-10-11 |
| 1-5-11 | 2-4-10 | 3-4-11 | 4-6-7 | 5-9-11 | 9-10-12 |
| 1-5-12 | 2-4-11 | 3-4-12 | 4-6-8 | 5-9-12 | 9-11-12 |
| 1-6-7 | 2-4-12 | 3-5-6 | 4-6-9 | 5-10-11 | 10-11-12 |
| 1-6-8 | 2-5-6 | 3-5-7 | 4-6-10 | 5-10-12 | |
| 1-6-9 | 2-5-7 | 3-5-8 | 4-6-11 | 5-11-12 | |

| | | | | | | | | |
|---|---|---|---|---|---|---|---|---|
| 1-2 | 1-10 | 2-8 | 3-7 | 4-7 | 5-8 | 6-10 | 8-9 | 10-12 |
| 1-3 | 1-11 | 2-9 | 3-8 | 4-8 | 5-9 | 6-11 | 8-10 | 11-12 |
| 1-4 | 1-12 | 2-10 | 3-9 | 4-9 | 5-10 | 6-12 | 8-11 | |
| 1-5 | 2-3 | 2-11 | 3-10 | 4-10 | 5-11 | 7-8 | 8-12 | |
| 1-6 | 2-4 | 2-12 | 3-11 | 4-11 | 5-12 | 7-9 | 9-10 | |
| 1-7 | 2-5 | 3-4 | 3-12 | 4-12 | 6-7 | 7-10 | 9-11 | |
| 1-8 | 2-6 | 3-5 | 4-5 | 5-6 | 6-8 | 7-11 | 9-12 | |
| 1-9 | 2-7 | 3-6 | 4-6 | 5-7 | 6-9 | 7-12 | 10-11 | |

EXACTA

BETTING DEVICE

BACKGROUND OF THE INVENTION

This invention relates to a betting device for indicating all of the combinations of numbers, for example of entries in a race, in groups, i.e., boxes or sets, of only two or three different ones of the numbers each. In betting, for example in a horse race, an exacta, a person bets the order of finish of two horses. A five-six exacta bet would mean that the bettor is betting that the number five entry will finish first and the number six entry will finish second. In a triple or trizacta race, a four-five-twelve bet would mean that the bettor is betting that the fourth horse would finish first, the fifth horse second, and the number twelve horse third. At times, the bettor, for instance in an exacta, may believe that the number three and four horses will finish first and second but is unsure of the order of their finish. He will therefore bet a "box" on those two horses. In betting a box, the bettor would receive a ticket which shows that he is betting both the three-four exacta and the four-three exacta. Also, in a triple bet, a box of say four-six-twelve would cover all permutations of those three numbers so that if those horses finished first, second and third in any order, the bettor would be covered for that triple or trizacta race. Normally, a race track is equipped to box all combinations of two (exacta) or three (trizacta) entries when the bettor has selected only two or three entries respectively. However, when he has selected more than two entries in an exacta or three entries in a trizacta, most tracks would not immediately provide him with all of the "boxes" which must be bet to cover all the combinations of those numbers in groups of only two (exacta) or three (trizacta) different ones of those numbers. Of course, one could sit down by hand and calculate all such combinations. However, error is likely to occur and the bettor or the track may make a mistake and not cover all of the bets desired for the combination of entries selected.

SUMMARY OF THE INVENTION

The present invention relates to a betting device for indicating all of the combinations of numbers of entries in groups of two (for an exacta) or three (for a trizacta or triple) different ones of the numbers each from at least three (exacta) or four (trizacta or triple) different preselected ones of the numbers. The invention includes a base card having all of the combinations of numbers 1 through $n$ in groups, i.e., boxes or sets, of only two (exacta) or three (trizacta or triple) different ones of the numbers each thereon. For example, in a trizacta or triple, the base card will list all of the following groups, i.e., boxes or sets of numbers up to, for example, 12 entries as follows:

| TRIPLE | | | | | |
|---|---|---|---|---|---|
| 1-2-3 | 1-6-10 | 2-5-8 | 3-5-9 | 4-6-12 | 6-7-8 |
| 1-2-4 | 1-6-11 | 2-5-9 | 3-5-10 | 4-7-8 | 6-7-9 |
| 1-2-5 | 1-6-12 | 2-5-10 | 3-5-11 | 4-7-9 | 6-7-10 |
| 1-2-6 | 1-7-8 | 2-5-11 | 3-5-12 | 4-7-10 | 6-7-11 |
| 1-2-7 | 1-7-9 | 2-5-12 | 3-6-7 | 4-7-11 | 6-7-12 |
| 1-2-8 | 1-7-10 | 2-6-7 | 3-6-8 | 4-7-12 | 6-8-9 |
| 1-2-9 | 1-7-11 | 2-6-8 | 3-6-9 | 4-8-9 | 6-8-10 |
| 1-2-10 | 1-7-12 | 2-6-9 | 3-6-10 | 4-8-10 | 6-8-11 |
| 1-2-11 | 1-8-9 | 2-6-10 | 3-6-11 | 4-8-11 | 6-8-12 |
| 1-2-12 | 1-8-10 | 2-6-11 | 3-6-12 | 4-8-12 | 6-9-10 |
| 1-3-4 | 1-8-11 | 2-6-12 | 3-7-8 | 4-9-10 | 6-9-11 |
| 1-3-5 | 1-8-12 | 2-7-8 | 3-7-9 | 4-9-11 | 6-9-12 |
| 1-3-6 | 1-9-10 | 2-7-9 | 3-7-10 | 4-9-12 | 6-10-11 |
| 1-3-7 | 1-9-11 | 2-7-10 | 3-7-11 | 4-10-11 | 6-10-12 |

| -continued | | | | | |
|---|---|---|---|---|---|
| TRIPLE | | | | | |
| 1-3-8 | 1-9-12 | 2-7-11 | 3-7-12 | 4-10-12 | 6-11-12 |
| 1-3-9 | 1-10-11 | 2-7-12 | 3-8-9 | 4-11-12 | 7-8-9 |
| 1-3-10 | 1-10-12 | 2-8-9 | 3-8-10 | 5-6-7 | 7-8-10 |
| 1-3-11 | 1-11-12 | 2-8-10 | 3-8-11 | 5-6-8 | 7-8-11 |
| 1-3-12 | 2-3-4 | 2-8-11 | 3-8-12 | 5-6-9 | 7-8-12 |
| 1-4-5 | 2-3-5 | 2-8-12 | 3-9-10 | 5-6-10 | 7-9-10 |
| 1-4-6 | 2-3-6 | 2-9-10 | 3-9-11 | 5-6-11 | 7-9-11 |
| 1-4-7 | 2-3-7 | 2-9-11 | 3-9-12 | 5-6-12 | 7-9-12 |
| 1-4-8 | 2-3-8 | 2-9-12 | 3-10-11 | 5-7-8 | 7-10-11 |
| 1-4-9 | 2-3-9 | 2-10-11 | 3-10-12 | 5-7-9 | 7-10-12 |
| 1-4-10 | 2-3-10 | 2-10-12 | 3-11-12 | 5-7-10 | 7-11-12 |
| 1-4-11 | 2-3-11 | 2-11-12 | 4-5-6 | 5-7-11 | 8-9-10 |
| 1-4-12 | 2-3-12 | 3-4-5 | 4-5-7 | 5-7-12 | 8-9-11 |
| 1-5-6 | 2-4-5 | 3-4-6 | 4-5-8 | 5-8-9 | 8-9-12 |
| 1-5-7 | 2-4-6 | 3-4-7 | 4-5-9 | 5-8-10 | 8-10-11 |
| 1-5-8 | 2-4-7 | 3-4-8 | 4-5-10 | 5-8-11 | 8-10-12 |
| 1-5-9 | 2-4-8 | 3-4-9 | 4-5-11 | 5-8-12 | 8-11-12 |
| 1-5-10 | 2-4-9 | 3-4-10 | 4-5-12 | 5-9-10 | 9-10-11 |
| 1-5-11 | 2-4-10 | 3-4-11 | 4-6-7 | 5-9-11 | 9-10-12 |
| 1-5-12 | 2-4-11 | 3-4-12 | 4-6-8 | 5-9-12 | 9-11-12 |
| 1-6-7 | 2-4-12 | 3-5-6 | 4-6-9 | 5-10-11 | 10-11-12 |
| 1-6-8 | 2-5-6 | 3-5-7 | 4-6-10 | 5-10-12 | |
| 1-6-9 | 2-5-7 | 3-5-8 | 4-6-11 | 5-11-12 | |

Each group, i.e., box or set, of three different numbers each, represents six different permutations of that group or box. For example, the groups or box two-four-five can be arranged as: 245, 254, 425, 452, 524, 542. However, all of those permutations are covered and embodied in the one representative box of any single group of the different ones of the three numbers listed on the base card. As a result, the groups, i.e., boxes or sets, of numbers shown on the base card represent six times, in permutations, the groups actually shown. Of course, if other total numbers of entries were desired to be covered, then the card could of course have a greater or lesser number of combinations. For an exacta, the base card would have the following groups of numbers listed on it.

| EXACTA | | | | | | | | |
|---|---|---|---|---|---|---|---|---|
| 1-2 | 1-10 | 2-8 | 3-7 | 4-7 | 5-8 | 6-10 | 8-9 | 10-12 |
| 1-3 | 1-11 | 2-9 | 3-8 | 4-8 | 5-9 | 6-11 | 8-10 | 11-12 |
| 1-4 | 1-12 | 2-10 | 3-9 | 4-9 | 5-10 | 6-12 | 8-11 | |
| 1-5 | 2-3 | 2-11 | 3-10 | 4-10 | 5-11 | 7-8 | 8-12 | |
| 1-6 | 2-4 | 2-12 | 3-11 | 4-11 | 5-12 | 7-9 | 9-10 | |
| 1-7 | 2-5 | 3-4 | 3-12 | 4-12 | 6-7 | 7-10 | 9-11 | |
| 1-8 | 2-6 | 3-5 | 4-5 | 5-6 | 6-8 | 7-11 | 9-12 | |
| 1-9 | 2-7 | 3-6 | 4-6 | 5-7 | 6-9 | 7-12 | 10-11 | |

Each group, i.e., box or set, of two different numbers each represents two different permutations of that group or box. For example, the group or box six-seven can be arranged as: 67,76. However, all of those permutations are covered and embodied in the one representative box of any single group of the different ones of the two numbers listed on the base card. As a result, the groups, i.e., boxes or sets, shown on the base card represent two times, in permutations, the groups actually shown. The order of the two or three different numbers is unimportant since it is merely the combination of them which denotes a box.

The invention further includes a first overlay sheet which covers all the groups of numbers of the base card which include the number one and exposes all of the groups of numbers on the base card which include only numbers other than one when the first sheet overlies the base card. Likewise, a second overlay sheet is provided which covers all of the groups of numbers on the base card which include the number two and exposes all of the groups of numbers on the base card which include only numbers other than two when the second sheet overlies the base card. Additionally, third, fourth, etc. overlay sheets are provided with the number of overlay sheets corresponding to the number of entries covered on the base card. In use of the invention, when the overlay sheets corresponding to at least two (exacta) or three (trizacta or triple) different preselected ones of the numbers are removed from their position overlying the base card, all the boxed combinations of the preselected numbers in groups of only two (exacta) or three (trizacta) different ones of the numbers each on the base card, are exposed.

Each of the overlay sheets may be identical in shape and size to that of the base card and advantageously the first through the highest number overlay sheet may be stacked on the base card in numerical order so that their position can be easily determined and they can be easily removed from overlay position over the base card since all overlay sheets may be positioned over the base card as a starting position in use of the invention.

Each of the overlay sheets includes a transparent section through which all of the groups of numbers on the base card, which include only numbers other than that corresponding to the respective overlay sheet, are exposed when that sheet overlies the base card and an adiaphanous section which covers all of the groups of numbers on the base card which include the number corresponding to the respective overlay sheet when that sheet overlies the base card. Advantageously, each of the overlay sheets may be made of sheet plastic with the transparent section being made of clear plastic and each adiaphanous section being blackened, colored other than black or darkened.

For ease of removal of the overlay sheets from overlying position on the base card, the base card and all of the overlay sheets may be pivotally connected at one end thereof. In an alternative embodiment, the base card may form the back panel of a packet or pouch which contains the overlay sheets so that upon removal of at least three (exacta) or four (trizacta or triple) overlay sheets from the packet, all of the combinations of the numbers corresponding to those sheets in groups, i.e., boxes or sets, of only two (exacta) or three (trizacta or triple) different ones of the numbers each are exposed.

BRIEF DESCRIPTION OF THE DRAWING

FIG. 5 is a plan view on an enlarged scale of the base card for both first and second embodiments of the invention.

DESCRIPTION OF THE PREFERRED EMBODIMENTS

Figure 1:
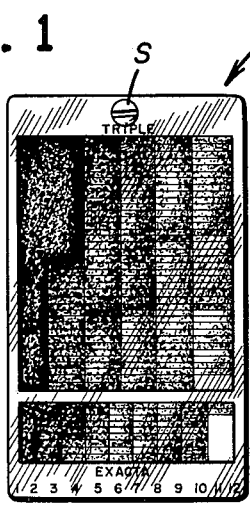
FIG. 1 is a plan view of a first embodiment of the invention.
Figure 2:
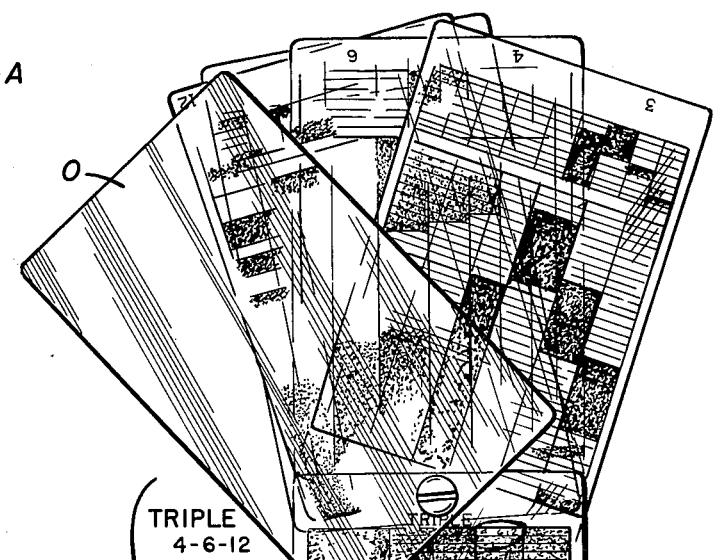
FIG. 2 is a view similar to FIG. 1 but showing the invention with four of the overlay sheets removed from position overlaying the base card.
Figure 3:
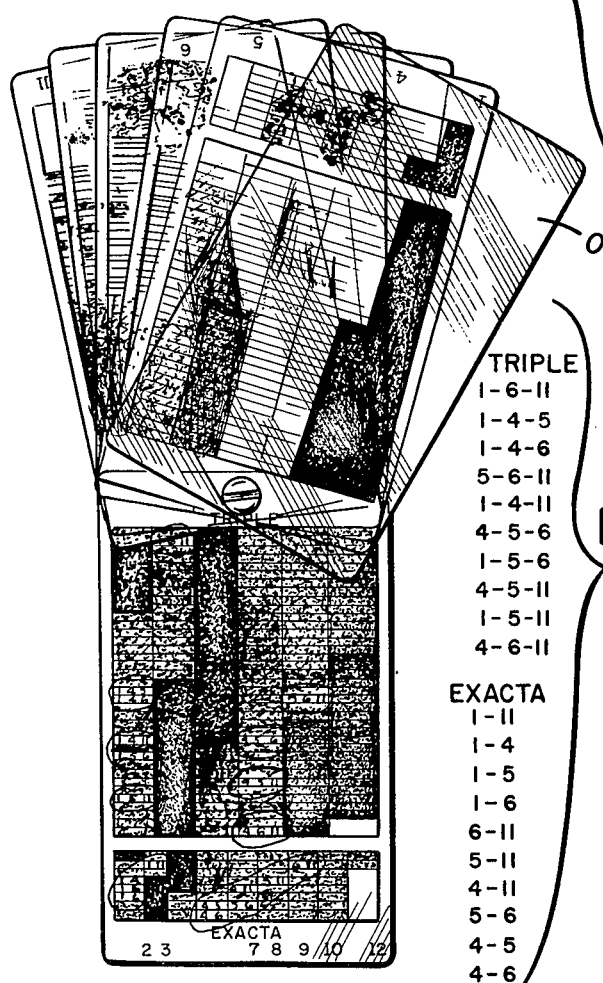
FIG. 3 is a view similar to FIG. 2 but showing five overlay cards so removed.

As shown in the drawings, the betting device A includes a base card B and a plurality of overlay sheets 1 through 12 which are adapted to overlie the base card A and cover certain portions thereof while exposing other portions.

As shown in FIG. 5, the base card B has all of the combinations of the numbers 1 through 12 in groups of only two different groups of ones of said numbers each thereon for an exacta as well as all of the combinations of numbers 1 through 12 in groups of only three different ones of said numbers each for a trizacta or triple. Although the boxed combinations for both the exacta and triple races have been shown on the base card B, it will be apparent to those skilled in the art that, if desired, only the exacta or only the triple boxed combinations could be on a single card. The listing of both the exacta and triple combinations on a single card B is of course for the convenience of bettors using the invention.

Figure 6:
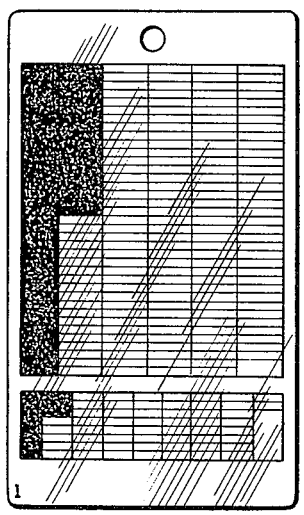
FIG. 6 is a plan view of the first overlay sheet.
Figure 7:
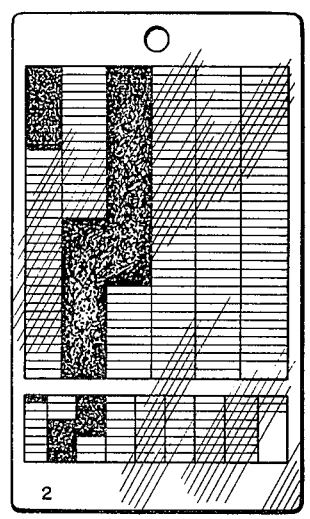
FIG. 7 is a plan view of the second overlay sheet.
Figure 8:
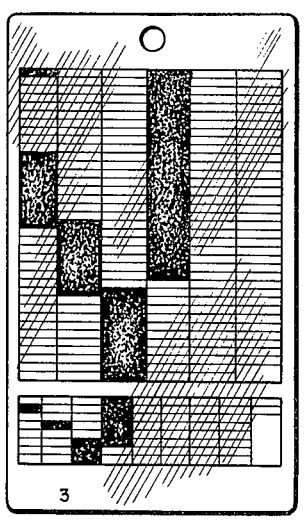
FIG. 8 is a plan view of the third overlay sheet.
Figure 9:
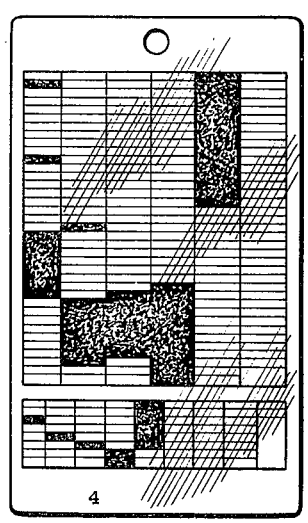
FIG. 9 is a plan view of the fourth overlay sheet.
Figure 10:
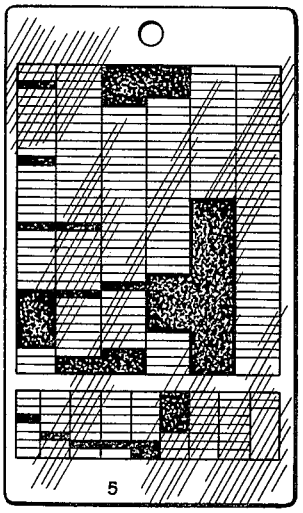
FIG. 10 is a plan view of the fifth overlay sheet.
Figure 11:
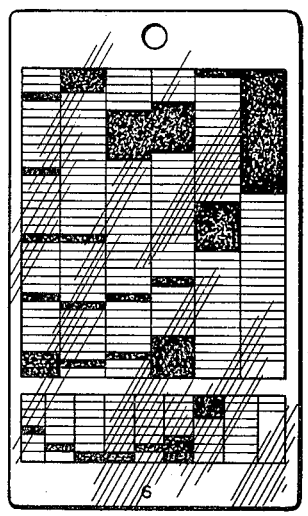
FIG. 11 is a plan view of the sixth overlay sheet.
Figure 12:
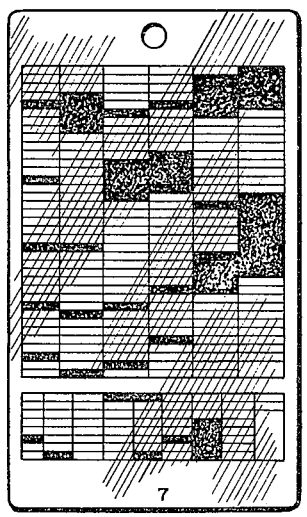
FIG. 12 is a plan view of the seventh overlay sheet.
Figure 13:
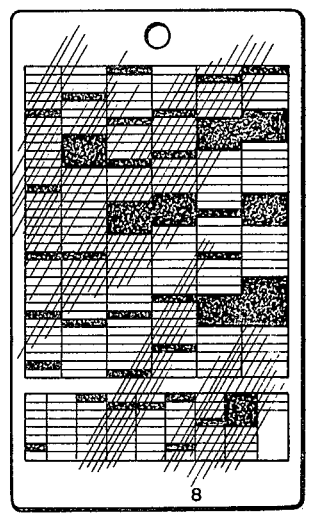
FIG. 13 is a plan view of the eighth overlay sheet.
Figure 14:
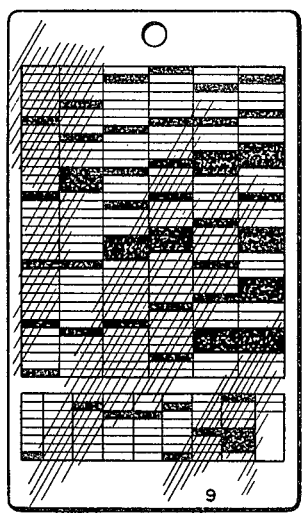
FIG. 14 is a plan view of the ninth overlay sheet.
Figure 15:
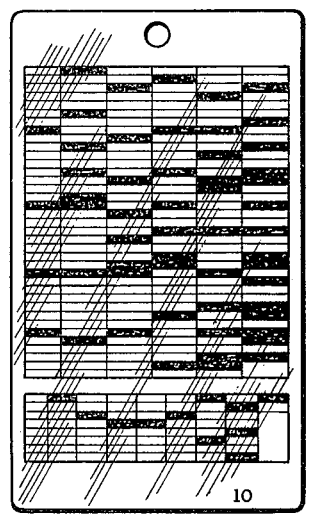
FIG. 15 is a plan view of the tenth overlay sheet.
Figure 16:
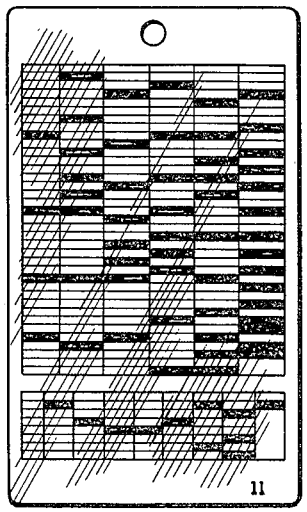
FIG. 16 is a plan view of the eleventh overlay sheet.
Figure 17:
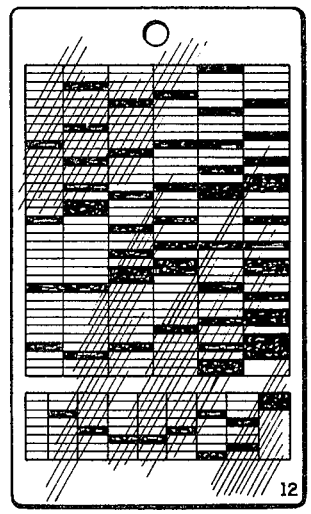
FIG. 17 is a plan view of the twelfth overlay sheet.

The invention further includes a completely transparent overlay cover sheet 0 which functions to protect the other overlay sheets 1 through 12 and the base card B from damage. Each of the overlay sheets on the base card can be made of a durable plastic material. Each of the overlay sheets numbered 1 through 12 is correlated to one of the numbers in the groups of numbers on the base card B. Each of the overlay sheets is substantially identical in size and shape to that of the base card B. The first overlay sheet 1 covers all of the groups of numbers on the base card B which include the number 1 and exposes all of the groups of numbers on the base card which include only numbers other than 1 when the first sheet overlies the base card. The exposure is effected because the overlay sheet is transparent in the portion thereof which overlies all the groups of numbers on the base card B which include only numbers other than 1 when the first sheet overlies the base card. The portion of the first overlay sheet which covers all of the groups of numbers on the base card which include the number 1 is completely blackened (speckling in FIG. 6) so that those groups of numbers are not visible through the first overlay sheet when it overlies the base card B. Alternatively, this portion may be colored other than black or darkened. Likewise, the second overlay sheet 2 covers all the groups of numbers on the base card B which include the number 2 and exposes all the groups of numbers on the base card which include only numbers other than 2 when the second sheet overlies the base card B. Similarly, the third through the twelfth overlay sheets cover all of the groups of numbers on the base card which include the number corresponding to that sheet and exposes all of the groups of numbers on the base card B which include only numbers other than the number corresponding to that sheet when it overlies the base card B. It is apparent from FIGS. 5 through 17 that the adiaphanous or blackened portions of each overlay sheet cover all of the groups of numbers on the base card B (FIG. 5) which include the number corresponding to that sheet when it overlies the base card B. As a result, in using the invention, when the overlay sheets corresponding to at least two (exacta) or three (trizacta or triple) different preselected ones (chosen entries) of said numbers are removed from their position overlying the base card B, all of the combinations of the preselected numbers in groups of only two (exacta) or three (trizacta or triple) different ones of the numbers each on the base card B are exposed. As a result, a bettor desiring to bet all of the chosen entries in an exacta or trizacta can immediately see all of the boxed combinations of the entries selected which must be bet.

To enable easy manipulation of the overlay sheets, the base card B and each of the overlay sheets may be pivotally connected at one end thereof for example by a screw S, rivet, pin or other pivot connecting means. Also, advantageously, instructions on the use of the invention can be placed on the back of the base card.

Figure 4:
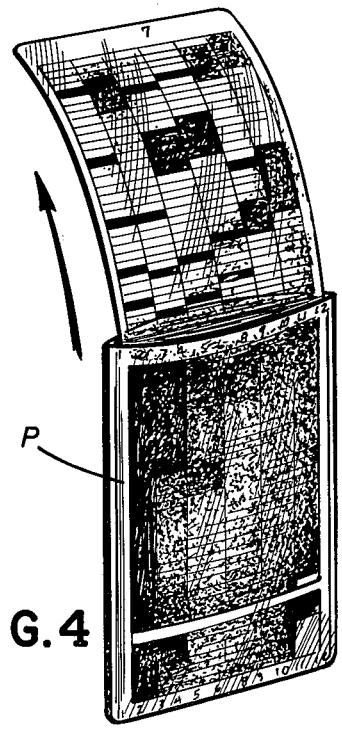
FIG. 4 is a perspective view of a second embodiment of the invention.

In a second embodiment of the invention shown in FIG. 4, the base card may be formed as the inside of the back of a packet or pouch P. The front of the pouch or packet P is transparent and each of the overlay sheets is positioned in the pouch P. Their function and use is identical to that described in the first embodiment. Therefore, when at least two (exacta) or three (triple) of the overlay sheets are removed from the packet or pouch, all of the combinations of the numbers corresponding to those overlay sheets which should be boxed are indicated and visible through the completely transparent front cover of the packet or pouch.

It is also contemplated in this invention that the transparent portion of each overlay sheet could be replaced with an aperture or window cut in that sheet. Such an aperture or window could be of the type cut in computer punch cards.

Although the invention has been described above with respect to horse racing, it will be evident to persons skilled in the art, that the betting device of this invention is likewise applicable to other types of sports events and competition.

Obviously, many modifications and variations of the present invention are possible in light of the foregoing teachings. It is therefore to be understood that within the scope of the appended claims the invention may be practiced otherwise than as specifically shown and described.

What I claim is:

1. A betting device for indicating all of the combinations of numbers 1 through $n$ (where $n$ is greater than 4), in groups of only two different ones of said numbers each, from at least three different preselected ones of said numbers, said device comprising:
   a base card having the following combinations of numbers 1 through $n$, in groups of only two different ones of said numbers each, thereon:
   1-2, 1-3, 1-4 to 1-$n$
   2-3, 2-4 to 2-$n$
   3-4 to 3-$n$
   4-$n$
   a first overlay sheet which covers all of the groups of numbers on the base card which include the number 1 and exposes all of the groups of numbers on the base card which include only numbers other than 1 when the first sheet overlies the base card;
   a second overlay sheet which covers all of the groups of numbers on the base card which include the number 2 and exposes all of the groups of numbers on the base card which include only numbers other than 2 when the second sheet overlies the base card;
   a third overlay sheet which covers all of the groups of numbers on the base card which include the number 3 and exposes all of the groups of numbers on the base card which include only numbers other than 3 when the third sheet overlies the base card;
   a fourth overlay sheet which covers all of the groups of numbers on the base card which include the number 4 and exposes all of the groups of numbers on the base card which include only numbers other than 4 when the fourth sheet overlies the base card;
   an $n$th overlay sheet which covers all of the groups of numbers on the base card which include the number $n$ and exposes all of the groups of numbers on the base card which include only numbers other than $n$ when the $n$th sheet overlies the base card whereby when the overlay sheets corresponding to at least three different preselected ones of said numbers are removed from their position overlying the base card, all of the combinations of the preselected numbers, in groups of only two different ones of said numbers each on the base card, are exposed; and
   each of said sheets having a character thereon enabling ready association of each associated sheet with the respective number covered by that sheet.

2. A betting device as claimed in claim 1, wherein:
   each of said overlay sheets is identical in shape and size to that of the base card; and
   said first through said $n$th overlay sheets are stacked on said base card in numerical order.

3. A betting device as claimed in claim 1, wherein:
   each of said overlay sheets comprises:
   a transparent section through which all of the groups of numbers on the base card which include only numbers other than that corresponding to the respective overlay sheet are exposed when the respective overlay sheet overlies the base card; and
   an adiaphanous section which covers all of the groups of numbers on the base card which include the number corresponding to the respective overlay sheet when the respective overlay sheet overlies the base card.

4. A betting device as claimed in claim 3, wherein:
   the adiaphanous section of each of said overlay sheets is black.

5. A betting device as claimed in claim 1, wherein:
   said base card and all of said overlay sheets are pivotally connected at one end thereof.

6. A betting device for indicating all of the combinations of numbers 1 through $n$ (where $n$ is a number greater than 4), in groups of only three different ones of said numbers each, from at least four different preselected ones of said numbers, said device comprising:
   a base card having the following combinations of numbers 1 through $n$, in groups of only three different ones of said numbers each, thereon:
   1-2-3, 1-2-4, 1-2-$n$, 1-3-4, 1-3-$n$ to 1-4-$n$
   2-3-4, 2-3-$n$ to 2-4-$n$
   3-4-$n$
   a first overlay sheet which covers all of the groups of numbers on the base card which include the number 1 and exposes all of the groups of numbers on the base card which include only numbers other than 1 when the first sheet overlies the base card;
   a second overlay sheet which covers all of the groups of numbers on the base card which include the number 2 and exposes all of the groups of numbers on the base card which include only numbers other than 2 when the second sheet overlies the base card;

a third overlay sheet which covers all of the groups of numbers on the base card which include the number 3 and exposes all of the groups of numbers on the base card which include only numbers other than 3 when the third sheet overlies the base card;

a fourth overlay sheet which covers all of the groups of numbers on the base card which include the number 4 and exposes all of the groups of numbers on the base card which include only numbers other than 4 when the fourth sheet overlies the base card;

an $n$th overlay sheet which covers all of the groups of numbers on the base card which include the number $n$ and exposes all of the groups of numbers on the base card which include only numbers other than $n$ when the $n$th sheet overlies the base card whereby when the overlay sheets corresponding to at least four different preselected ones of said numbers are removed from their position overlying the base card, all of the combinations of the preselected numbers, in groups of only three different ones of said numbers each on the base card, are exposed; and each of said sheets having a character thereon enabling ready association of each associated sheet with the respective number covered by that sheet.

7. A betting device as claimed in claim 6, wherein: each of said overlay sheets is identical in shape and size to that of the base card; and said first through said $n$th overlay sheets are stacked on said base card in numerical order.

8. A betting device as claimed in claim 6, wherein: each of said overlay sheets comprises:

a transparent section through which all of the groups of numbers on the base card which include only numbers other than that corresponding to the respective overlay sheet are exposed when the respective overlay sheet overlies the base card; and an adiaphanous section which covers all of the groups of numbers on the base card which include the number corresponding to the respective overlay sheet when the respective overlay sheet overlies the base card.

9. A betting device as claimed in claim 8, wherein: the adiaphanous section of each of said overlay sheets is black.

10. A betting device as claimed in claim 6, wherein: said base card and all of said overlay sheets are pivotally connected at one end thereof.

11. A betting device as claimed in claim 1, wherein: the character on each of said sheets is a number identical to the number covered by each respective sheet.

12. A betting device as claimed in claim 6, wherein: the character on each of said sheets is a number identical to the number covered by each respective sheet.

* * * * *